United States Patent [19]

Fukao et al.

[11] Patent Number: 5,211,733

[45] Date of Patent: May 18, 1993

[54] METHOD FOR PRODUCING A HIGH-PURITY SILICA GLASS POWDER

[75] Inventors: Takahisa Fukao; Takashi Komoda, both of Kitakyushu, Japan

[73] Assignee: Mitsubishi Kasei Corporation, Tokyo, Japan

[21] Appl. No.: 791,146

[22] Filed: Nov. 13, 1991

[30] Foreign Application Priority Data

Nov. 16, 1990 [JP] Japan .................................. 2-310893

[51] Int. Cl.$^5$ .............................................. C03B 1/00
[52] U.S. Cl. .......................................... 65/17; 65/900; 432/97; 501/12
[58] Field of Search ................... 65/17, 18.1, 900, 901, 65/374.13; 501/12; 432/97, 98

[56] References Cited

U.S. PATENT DOCUMENTS

| | | | |
|---|---|---|---|
| 3,615,187 | 10/1971 | Suzukawa et al. | 501/119 X |
| 3,956,004 | 5/1976 | Sugahara et al. | 501/29 X |
| 4,210,632 | 7/1980 | Rourke | 432/97 X |
| 4,266,978 | 5/1981 | Prochazka | 501/12 X |
| 4,778,626 | 10/1988 | Ramm et al. | 501/12 X |
| 4,826,521 | 5/1989 | Weichmann et al. | 65/901 X |
| 4,835,124 | 5/1989 | Pearson | 501/12 |
| 4,948,364 | 8/1990 | Thompson | 432/98 |

*Primary Examiner*—Robert L. Lindsay
*Attorney, Agent, or Firm*—Oblon, Spivak, McClelland, Maier & Neustadt

[57] ABSTRACT

A method for producing a high-purity silica glass powder by calcining a high purity silica gel powder, wherein a vertical-type moving bed apparatus equipped with a heating means is used in a moving bed system such that the feed silica gel powder is continuously supplied from an upper portion of the apparatus and discharged from a lower portion of the apparatus, and wherein a small amount of gas is blown to flow from a lower portion of the moving bed towards an upper portion of the moving bed, and the calcination is conducted at a temperature of from 1,000° to 1,300° C.

11 Claims, 1 Drawing Sheet

METHOD FOR PRODUCING A HIGH-PURITY SILICA GLASS POWDER

The present invention relates to a method for producing a high-purity silica glass powder useful for preparing a crucible for drawing up a silicon single crystal or useful in the semiconductor field as a sealing material for LSI.

For the production of common glass, a method is employed wherein starting material is melted in a container, followed by cooling. However, it has been difficult to obtain high-purity glass by this method, since impurities from the container used for melting, tend to be included in the product.

In recent years, there have been active research efforts to develop highly functional glass so-called new glass. For its production, a sol-gel method, a gas phase reaction method and a method of melting glass in a nongravity state and a method of super quenching have been proposed.

Among them, the sol-gel method is a glass-production method having a wide range of application, since the types of glass which can be produced by the sol-gel method using organic metal compounds such as metal alkoxides as starting materials, are extensive.

In this method, a sol is formed so that fine particles of a metal hydroxide or oxide obtained by the hydrolysis of such an organic metal compound are dispersed in a solution, and such a sol is subjected to gelation, followed by such steps as drying, calcining, pulverization and melting, to obtain glass.

As the metal alkoxide, tetramethoxysilane or tetraethoxysilane is used as starting material in many cases. However, other silicon alkoxides may be used as starting material.

The sol-gel method has advantages such that there is no problem of inclusion of impurities from the container, the starting material can easily be purified by such means as distillation, whereby high-purity glass can be obtained, products of various shapes including fibers and bulk products can be prepared and it is possible to produce glass at a relatively low temperature. On the other hand, it also has drawbacks such that the starting material is generally expensive, and the process requires a long period of time.

In the production of a high-purity glass powder by a liquid phase method including the sol-gel method, steps of drying, pulverization and calcination are required after formation of a gel, and such steps are regarded as a bottle neck in the production process. Especially in the calcination step, it is necessary to remove moisture and organic materials remaining in the interior of the gel after drying. Accordingly, calcination is conducted slowly over a long period of time i.e. from a few hours to a few tens hours. If the particle size of the gel to be calcined is small, the calcination temperature may be low, and the calcination time may be short. However, the calcination temperature is usually as high as from 800° to 1,300° C. Therefore, if the temperature control is improper, there is a danger that particles undergo sintering. Accordingly, it is necessary to take a due care for the uniformity of the temperature distribution in the calciner.

Because of the high purity product, it is necessary to avoid inclusion of impurities as far as possible by paying a due attention to the handling of the gel or calcined product during or between such process steps.

As a method for calcining the gel, it is common to employ a method wherein a silica gel is calcined in a stand still state in a calciner (Japanese Unexamined Patent Publication No. 168539/1986). Further, Japanese Unexamined Patent Publication No. 81315/1977 suggests that a silica gel is calcined in a fluidized bed, although such a method has not yet been practically employed.

However, in the method wherein calcination is conducted in a calciner in a stand still state, it is common to put the gel in a high-purity container in order to avoid inclusion of impurities and insert the container in the calciner, followed by calcination. However, in such a method wherein the gel is put in a container for calcination, the productivity is poor because of the cumbersomeness of charging into and discharging from the container as well as a limitation in the size of the container. Thus, such a method is not suitable for a large scale calcination. Besides, impurities are likely to be included during the handling in the process.

Accordingly, to continuously treating a large amount of silica gel powder by calcination, it would be desirable if it is possible to employ a treating method such as a fluidized bed system or a moving bed system. However, in the case of a fluidized bed system, the friction between the silica particles and the inner wall of the apparatus is so great that there is a drawback such that components of the inner wall usually made of bricks or the like are likely to be included as impurities. In the case of the moving bed system, the particle size of the powder to be treated is usually required to be at least a few mm. Otherwise, smooth movement in the apparatus tends to be difficult. Therefore, it has been believed difficult to treat fine particles at a level of from 100 to 800 μm under a stabilized condition.

Under these circumstances, the present inventors have conducted extensive researches on a method for producing a high-purity silica glass powder by continuously calcining a dried high-purity silica gel powder and as a result, have found that by conducting calcination in a moving bed system employing a certain specific means, even a fine silica powder can be treated smoothly and excellent results can be obtained. The present invention has been accomplished on the basis of this discovery.

Thus, it is an object of the present invention to conduct calcination of a high-purity silica gel powder industrially advantageously.

The present invention provides a method for producing a high-purity silica glass powder by calcining a high purity silica gel powder, wherein a vertical-type moving bed apparatus equipped with a heating means is used in a moving bed system such that the feed silica gel powder is continuously supplied from an upper portion of the apparatus and discharged from a lower portion of the apparatus, and wherein a small amount of gas is blown to flow from a lower portion of the moving bed towards an upper portion of the moving bed, and the calcination is conducted at a temperature of from 1,000° to 1,300° C.

In the accompanying drawing, FIG. 1 is a diagrammatical view illustrating an embodiment of the vertical-type moving bed apparatus to be used in the present invention.

Now, the present invention will be described in detail with reference to the preferred embodiments.

In the present invention, the high-purity silica gel powder to be calcined may, usually, be a powder of high-purity silica gel obtained by a sol-gel method wherein an alkoxysilane is used as starting material.

In this sol-gel method, the alkoxysilane is hydrolyzed to form a sol wherein fine particles of silicon hydroxide or oxide are dispersed, and the sol is then gelled, followed by drying, pulverization and calcination to obtain a silica glass powder, which is then subjected to such steps as pulverization and melting to obtain a high-purity silica glass product.

In the present invention, it is also possible to employ a high-purity silica gel powder obtained by a method other than the above sol-gel method, such as a modified sol-gel method wherein fine silica powder is present during the hydrolysis, or an alkali metal silicate is used as starting material, or a hydrolysis or gas phase reaction method wherein a silicon halide is used as starting material.

The particle size of the high-purity silica gel powder to be used in the present invention, is usually from 100 to 800 $\mu$m, preferably from 100 to 500 $\mu$m, although the particle size may vary depending upon the density. Further, the bulk density of the powder is usually from 0.6 to 0.7 g/cm$^3$. This bulk density changes to a level of from 1.0 to 1.5 g/cm$^3$ by the calcination treatment. The silica gel powder to be treated by the present invention is of high purity. For example, the total content of alkali metals such as Na and K, and other metal components such as Fe, Cu and Ni, is usually at most 1 ppm, preferably at most 0.1 ppm. Further, the water content of the silica gel powder to be subjected to the calcination treatment, is usually at most 10% by weight.

In the present invention, to calcine such a high-purity silica gel powder, a vertical-type moving bed apparatus equipped with a heating means, is used, and a moving bed system is adopted in such a manner that the feed silica gel powder is continuously supplied from an upper portion of the apparatus and discharged from a lower portion of the apparatus, and a small amount of a gas is blown to flow from a lower portion of the moving bed towards an upper portion of the moving bed. The calcination is conducted at a temperature of from 1,000° to 1,300° C. The calcination time is usually from 1 to 30 hours, preferably from 3 to 20 hours.

The residence time of the high-purity silica gel powder in the vertical-type moving bed apparatus is preferably from 1 to 50 hours.

The moving bed apparatus to be used in the present invention, is usually cylindrical, and the cross sectional shape is preferably circular from the view-point of the uniformity of the temperature distribution in the bed or of the fabrication of the body of the apparatus. However, the cross sectional shape may be any other form such as a rectangular, polygonal or oval shape.

Further, various configurations are conceivable including a configuration in which the diameter of the apparatus does not change from the top to the bottom, a configuration in which the diameter of the apparatus gradually increases towards the bottom, and a configuration in which the diameter decreases towards the bottom. In any case, the apparatus is of a vertical-type. There is no particular restriction with respect to the size of the moving bed apparatus. However, an apparatus commonly employed for industrial purpose usually has an inner diameter of from 20 to 150 cm and a height of from 3 to 20 m.

As the heat source for heating, it is possible to employ any source such as electricity, a liquid fuel or a gas fuel. The heating method may also be of any type such as internal heating, external heating or a combination thereof. With a view to avoiding inclusion of impurities in the product an external heating system is preferred. However, internal heating may be employed without any trouble, if a lining is provided to the heating element by means of silica glass, silicon carbide or silicon nitride.

To ensure the uniformity of the temperature distribution in the radial direction, internal heating may be employed.

In the present invention, the vertical-type moving bed apparatus used for forming a moving bed, is preferably such that the inner surface which is in contact with the silica gel powder to be calcined, is made of a heat resistant and abrasion resistant material such as silica glass, silicon carbide or silicon nitride, so that inclusion of impurities in the calcined product can be reduced.

In the present invention, it is essential to blow a small amount of gas to flow from the lower portion towards the upper portion during the calcination. As such a gas, air, nitrogen, argon or helium, may usually be employed. The moisture in the gas should better be minimum. Usually, a dry gas is used. By preliminarily heating such a gas, an energy for heating can be saved. For preheating such a gas, an indirect heat exchange with a discharged gas is advantageous. By such a heat exchange, the total energy consumption can be reduced. Further, by indirectly heating the starting material supplied to the apparatus, by a discharged gas, the overall energy efficiency can be improved. Further, the gas supply inlet may be divided into a plurality of inlets to improve the dispersion of the gas.

In the present invention, the moving bed is meant for a particle layer moving downwardly by the weight of the particles packed in a container or by a mechanical operation such as vibration.

The amount of the gas to be blown into the apparatus is, for example, from 10 to 3,000 cm/min., preferably from 10 to 200 cm/min., more preferably from 30 to 100 cm/min., as the linear velocity of the gas, since the gas has also a function to transport at least the moisture or a gas such as carbon dioxide generated during the calcination, out of the system. The calcining temperature and the calcining time may differ substantially depending upon the particle size distribution of the high-purity silica gel powder. However, the calcining temperature is usually within a range of from 1,000° to 1,300° C., preferably from 1,000° to 1,200° C. If the calcining temperature is too high, particles are likely to undergo sintering, whereby the operation of the calciner will likely be impossible. The sintering temperature of the particles varies depending upon the particle size. The smaller the particle size, the lower the sintering temperature. On the other hand, the calcining time is usually from 1 to 30 hours, preferably from 3 to 20 hours. In the present invention, in the moving bed apparatus, the silica powder is sequentially preheated, calcined and cooled to finally obtain the desired silica glass powder. The silanol group concentration in the silica glass powder thus obtained, is usually at most 1,000 ppm, preferably at most 100 ppm.

With respect to the calcining pressure, an operation under atmospheric pressure is simple from the viewpoint of the structure of the apparatus. However, a pressurizing operation or a pressure reducing operation may be conducted. In the pressurizing or pressure-reducing operation, it is necessary to take into consideration e.g. the sealing problem at the inlet of the feed material or at the outlet of the product as well as the strength of the apparatus.

The moving bed has such merits that the residence time of the particles can easily be controlled, powdering and dust-formation are minimum, and high-purity products can easily be obtained as compared with other calcining systems.

The particle size of the silica gel powder to be treated by the present invention, is usually from 100 to 800 μm, preferably from 100 to 500 μm. If the particle size is small, the air flow in the moving bed tends to be poor, and there is a possibility of sintering. Therefore, it is necessary to control the moving rate of the powder, the amount of the gas to be supplied and the calcining temperature.

In the present invention, a moving bed system is adopted in which a high-purity silica gel powder is continuously supplied from an upper portion of a vertical-type moving bed apparatus and discharged from a lower portion. Here, "continuously" includes not only a case where said powder is supplied from the upper portion of the apparatus and discharged from the lower portion without interruption, but also a case where such supply and discharge operations are conducted intermittently.

Further, the moving velocity of the moving bed is usually from 10 to 50 cm/hr.

With respect to the supply and discharge of said powder, the supply from an upper portion of the apparatus includes the supply from the top or from an upper side portion, and likewise the discharge from a lower portion includes the discharge from the bottom or from a lower side portion.

Now, the present invention will be described specifically with reference to the drawing.

BRIEF DESCRIPTION OF THE DRAWING

In FIG. 1, reference numeral 1 indicates a heater, numeral 2 indicates a valve for supplying the feed material, numeral 3 indicates an inlet for the feed material, numeral 4 indicates an outlet of the gas, numeral 5 indicates the material to be calcined, numeral 6 indicates the body of the apparatus, numeral 7 indicates an outlet for cooling medium, numeral 8 indicates an inlet for the cooling medium, numeral 9 indicates a gas dispersing device, numeral 10 indicates a feeder for a calcined product, and numeral 11 indicates an inlet for the gas.

Figure 1:
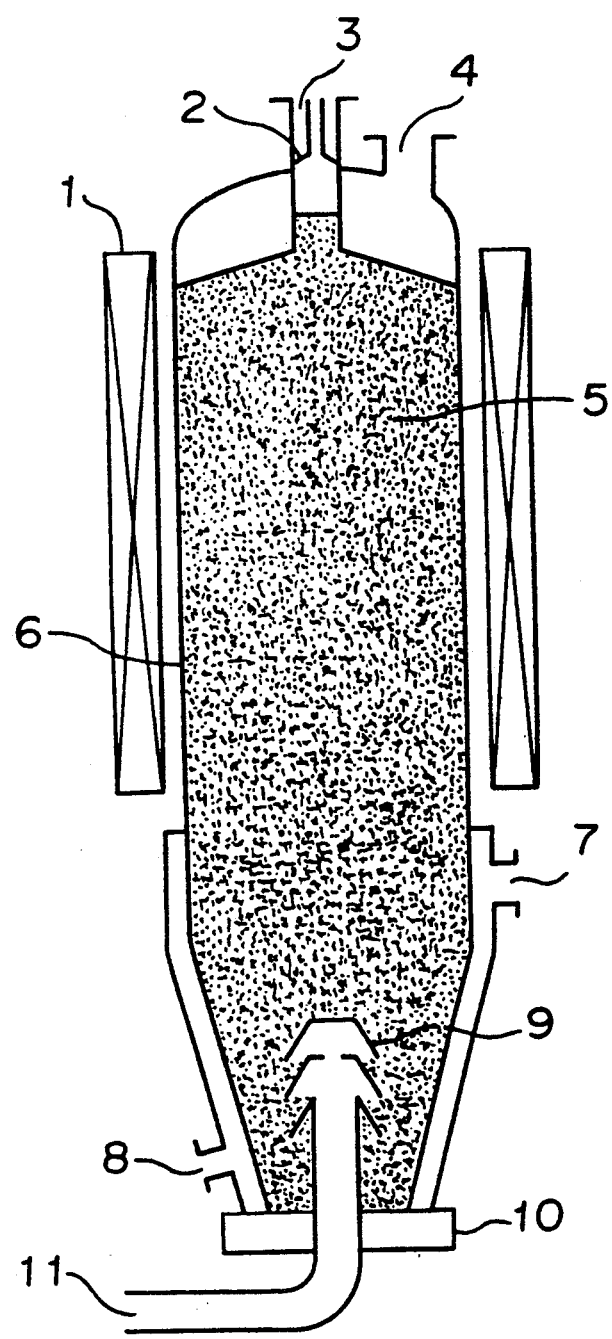
FIG. 1 is a diagrammatic view illustrating an embodiment of the vertical-type moving bed apparatus to be used in the present invention.

The high-purity silica gel powder feed material is supplied into the body 6 of the apparatus from the inlet 3 for the feed material via the supply valve 2 for the feed material. The material to be calcined thus supplied gradually moves downwardly as the discharge from the lower portion of the apparatus proceeds. During the movement, it is heated by a heater 1 for calcination. After a sufficient residential time, it is cooled at a lower portion of the apparatus and finally discharged out of the system by the feeder 10 for the calcined product. With respect to the type of the feeder for the calcined product, any type may be employed including a rotational type such as a table feeder, a reciprocating type such as a vibration feeder, and a container receiving type such as a screw feeder.

On the other hand, the gas is supplied from the inlet 11 for the gas, then uniformly dispersed in the apparatus by the gas dispersing device 9, then ascends among the particles and is finally discharged from the outlet 4 for the gas.

As described in the foregoing, the discharged gas is indirectly heat-exchanged with the feed gas supplied to the gas inlet 11, whereby the energy efficiency can be improved.

Further, for the protection of the feeder 10 for the calcined product and to simplify the handling after the discharge, cooling of the calcined product is conducted by supplying cooling medium from the inlet 8 for a cooling medium. The cooling medium heated by the heat exchange with the calcined product, will be purged out of the system from the outlet 7 for the cooling medium. The cooling medium is not limited to water, and other cold medium may be employed. By lining the inner surface of the main body 6 of the apparatus with silica glass or a heat resistant and abrasion resistant ceramic such as silicon carbide or silicon nitride, it is possible to minimize inclusion of impurities caused by abrasion due to the contact between the particles and the wall.

According to the method of the present invention, a large amount of a silica gel powder can efficiently be treated since the calcination can be conducted continuously in a moving bed system. The internal temperature distribution of the calcined product is relatively uniform, and the fluctuation in the quality depending upon the particular position is minimum, whereby powdering is less as compared with the fluidized bed system, and it is possible to obtain a product having a sharp particle size distribution. It is very unexpected that such a fine powder like silica particles can be treated by a moving bed system. The reason for this is not clearly understood. However, in the case of the present invention, a small amount of gas is permitted to flow from the lower portion of the moving bed, and this is believed to provide a certain good influence.

What is claimed is:

1. A method for producing a high-purity silica glass powder by calcining a high purity silica gel powder, wherein a vertical-type moving bed apparatus equipped with a heating means is used in a moving bed system such that said silica gel powder is continuously supplied from an upper portion of the apparatus and discharged from a lower portion of the apparatus, the velocity of the moving bed being from 10 to 50 cm/hr, and wherein a gas at a linear velocity of from 10 to 3,000 cm/min. is blown to flow from a lower portion of the moving bed towards an upper portion of the moving bed, and the calcination is conducted at a temperature of from 1,000° to 1,300° C.

2. The method according to claim 1, wherein the vertical-type moving bed apparatus has an inner surface in contact with the high-purity silica gel powder, said inner surface being made of a material selected from the group consisting of silica glass, silicon carbide and silicon nitride.

3. The method according to claim 1, wherein the high-purity silica gel powder is obtained by a sol-gel method using an alkoxysilane as starting material.

4. The method according to claim 1, wherein the silica gel powder has a particle size of from 100 to 800 μm.

5. The method according to claim 1, wherein the silanol group concentration of the high-purity silica glass powder after the calcination is at most 1,000 ppm.

6. The method according to claim 1, wherein the gas is selecting from the group consisting of air, nitrogen and argon.

7. The method according to claim 1, wherein the total content of metal components in the feed silica gel powder is at most 1 ppm.

8. The method according to claim 1, wherein the water content of the silica gel powder is at most 10% by weight.

9. The method according to claim 1, wherein the vertical-type moving bed apparatus has a cooling zone provided with a cooling means, below a heating zone provided with a heating means.

10. The method according to claim 1, wherein the residence time of the high-purity silica gel powder in the vertical-type moving bed apparatus is from 1 to 50 hours.

11. The method according to claim 1, wherein the vertical-type moving bed apparatus has an inner diameter of from 20 to 150 cm and a height of from 3 to 20 m.

* * * * *